United States Patent
Cole et al.

(10) Patent No.: US 6,561,398 B1
(45) Date of Patent: May 13, 2003

(54) RACK ASSEMBLY FOR A VEHICLE

(75) Inventors: Stephen J. Cole, Arcata, CA (US); Gregory A. Dean, McKinleyville, CA (US); Joseph J. Settelmayer, Fieldbrook, CA (US)

(73) Assignee: Yakima Products, Inc., Arcata, CA (US)

(*) Notice: Subject to any disclaimer, the term of this patent is extended or adjusted under 35 U.S.C. 154(b) by 0 days.

(21) Appl. No.: 09/556,878

(22) Filed: Apr. 19, 2000

Related U.S. Application Data (63) Continuation-in-part of application No. 09/505,056, filed on Feb. 16, 2000, now Pat. No. 6,425,509, which is a continuation-in-part of application No. 09/447,908, filed on Nov. 23, 1999, now Pat. No. 6,283,310.

(51) Int. Cl.[7] .............................................. B60R 9/048
(52) U.S. Cl. ........................................ 224/324; 224/924
(58) Field of Search ................................ 224/924, 324; 211/20

(56) References Cited

U.S. PATENT DOCUMENTS

| 357,287 A | 2/1887 | Nolte |
|---|---|---|
| 376,055 A | 1/1888 | Hopkins et al. |
| 2,271,452 A | 1/1942 | Carroll |
| 3,258,820 A | 7/1966 | Steinberg |
| 3,292,222 A | 12/1966 | Steinberg |
| 3,662,435 A | 5/1972 | Allsop |
| 3,668,791 A | 6/1972 | Salzman et al. |
| 3,900,923 A | 8/1975 | Thomas |
| 3,906,593 A | 9/1975 | Caveney et al. |
| 4,021,888 A | 5/1977 | Aimar |
| 4,112,557 A | 9/1978 | Salomon |
| 4,193,171 A | 3/1980 | Lichowsky |
| 4,310,951 A | 1/1982 | Riedel |
| 4,326,320 A | 4/1982 | Riedel |

(List continued on next page.)

FOREIGN PATENT DOCUMENTS

| EP | 0 161 441 A1 | 11/1985 |
|---|---|---|
| EP | 0 220 784 A1 | 5/1987 |
| EP | 0 224 288 A1 | 6/1987 |
| IT | 022451 | 11/1989 |

*Primary Examiner*—Stephen P. Garbe
(74) *Attorney, Agent, or Firm*—Kolisch Hartwell, P.C.

(57) ABSTRACT

A rack assembly for carrying recreational equipment on a vehicle. The assembly includes at least one mount attachable to the vehicle, and a load-carrying support member coupled to the mount and configured to support the recreational equipment adjacent the vehicle. At least one securing apparatus is associated with the load-carrying support member and configured to secure the equipment to the support member. The securing apparatus includes a strap adapted to extend at least partially around the recreational equipment, and a ratchet drive mechanism adapted to receive and grip one end of the strap. In one embodiment, the ratchet drive mechanism includes at least one drive actuator that is operable to grip successive portions of the strap and draw it tight around the recreational equipment.

44 Claims, 5 Drawing Sheets

U.S. PATENT DOCUMENTS

| | | |
|---|---|---|
| 4,424,636 A | 1/1984 | Everest |
| 4,453,290 A | 6/1984 | Riedel |
| 4,501,354 A | 2/1985 | Hoffman |
| 4,547,980 A | 10/1985 | Olivieri |
| 4,553,292 A | 11/1985 | Pradier et al. |
| 4,555,830 A | 12/1985 | Petrini et al. |
| 4,596,080 A | 6/1986 | Benoit et al. |
| 4,614,047 A | 9/1986 | Arieh et al. |
| 4,624,063 A | 11/1986 | Delery |
| 4,646,401 A | 3/1987 | Morell |
| 4,670,946 A | 6/1987 | Olivieri |
| 4,683,620 A | 8/1987 | Valsecchi et al. |
| 4,702,401 A * | 10/1987 | Graber et al. ............ 224/42.03 |
| 4,727,630 A | 3/1988 | Alan |
| 4,759,137 A | 7/1988 | Lederer |
| 4,761,898 A | 8/1988 | Courvoisier et al. |
| 4,796,337 A | 1/1989 | Marxer |
| 4,912,817 A | 4/1990 | Sandreid |
| 5,003,711 A | 4/1991 | Nerrinck et al. |
| 5,083,350 A | 1/1992 | Sandreid |
| 5,172,454 A | 12/1992 | Martignago |
| 5,193,254 A | 3/1993 | Geisinger |
| 5,288,001 A | 2/1994 | Locarno |
| 5,357,690 A | 10/1994 | Ho |
| 5,416,952 A | 5/1995 | Dodge |
| 5,426,826 A | 6/1995 | Takimoto |
| 5,526,555 A | 6/1996 | Battistella et al. |
| 5,570,825 A * | 11/1996 | Cona ........................ 224/495 |
| 5,573,165 A | 11/1996 | Bloemer et al. |
| 5,624,063 A * | 4/1997 | Ireland ...................... 224/324 |
| 5,745,959 A | 5/1998 | Dodge |
| 5,752,298 A * | 5/1998 | Howell ........................ 24/585 |
| 5,820,002 A * | 10/1998 | Allen ......................... 224/324 |

\* cited by examiner

RACK ASSEMBLY FOR A VEHICLE

CROSS-REFERENCE TO RELATED APPLICATIONS

This application is a continuation-in-part of U.S. patent application Ser. No. 09/505,056, filed Feb. 16, 2000, now U.S. Pat. No. 6,425,509 which is a continuation-in-part of U.S. patent application Ser. No. 09/447,908, filed Nov. 23, 1999, now U.S. Pat. No. 6,283,310.

FIELD OF THE INVENTION

The present invention relates to vehicle racks, and more particularly to a vehicle-mountable rack and strap assembly for carrying recreational equipment on a vehicle.

BACKGROUND

In response to the increasing popularity of outdoor recreational activities such as bicycling, skiing, canoeing, etc., a variety of vehicle-mounted racks have been developed to allow recreational equipment to be carried on a vehicle. These vehicle racks typically include rigid cross-bars extending over the roof of the vehicle or adjacent the rear of the vehicle. Various load-carrying members adapted to support particular types of recreational equipment may be mounted on the cross bars. One or more straps may be positioned around the equipment to secure it to the rack. Typically, the straps must be pulled tightly around the equipment to hold it securely during normal driving speeds and conditions. Some users may find it difficult to apply sufficient tension to the strap. In addition, some users may find it difficult to secure the strap while maintaining the desired tension.

SUMMARY

The present invention provides a rack assembly for carrying recreational equipment on a vehicle. The assembly includes at least one mount attachable to the vehicle, and a load-carrying support member coupled to the mount and configured to support the recreational equipment adjacent the vehicle. At least one securing apparatus is associated with the load-carrying support member and configured to secure the equipment to the support member. The securing apparatus includes a strap adapted to extend at least partially around the recreational equipment, and a ratchet drive mechanism adapted to receive and grip one end of the strap. In one embodiment, the ratchet drive mechanism includes a drive actuator that is operable to grip the strap and draw it tight around the recreational equipment.

DETAILED DESCRIPTION

Figure 1:
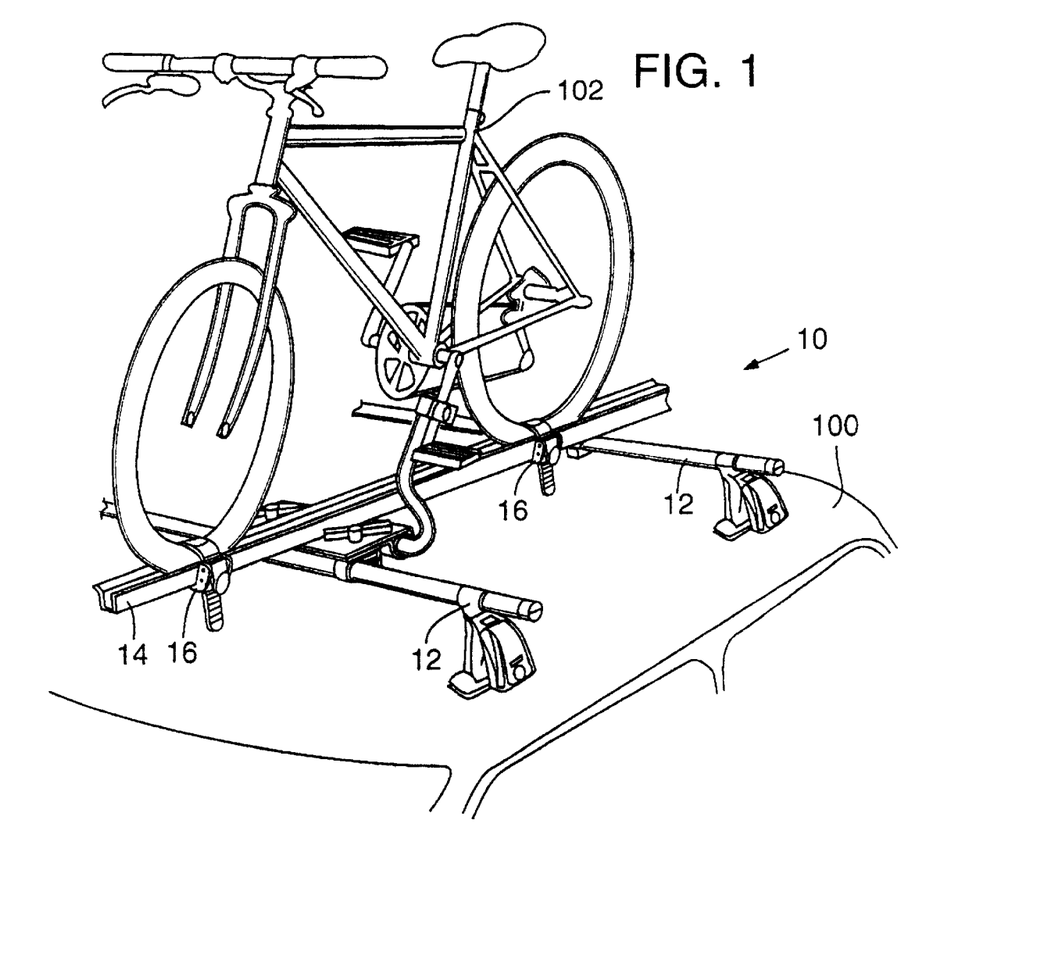
FIG. 1 is a perspective view of an exemplary embodiment of a rack assembly according to the present invention.

A rack assembly for carrying recreational equipment on a vehicle according to the present invention is indicated generally at 10 in FIG. 1. Rack assembly 10 includes one or more mounts 12 attachable to a vehicle. Rack assembly 10 also includes one or more support members 14 coupled to mounts 12 and adapted to support recreational equipment adjacent a vehicle. At least one securing apparatus 16 is associated with each support member 14 to secure recreational equipment to the support member.

In the exemplary embodiment depicted in FIG. 1, rack assembly 10 is shown mounted on the roof of a vehicle 100, and having a wheel support member 14 adapted to support the wheel of a bicycle 102. Alternatively, rack assembly 10 may be configured to mount at other positions on a vehicle such as the rear or trunk of the vehicle, on a vehicle hitch, etc. In addition, rack assembly 10 may include support members that are adapted to carry recreational equipment other than bicycles such as canoes, kayaks, surfboards, camping equipment, etc. Therefore, while the invention is described below in the context of securing a bicycle to a rack mounted on the roof of a vehicle, it will be understood that all such vehicle racks and support members are included within the scope of the invention.

Figure 2:
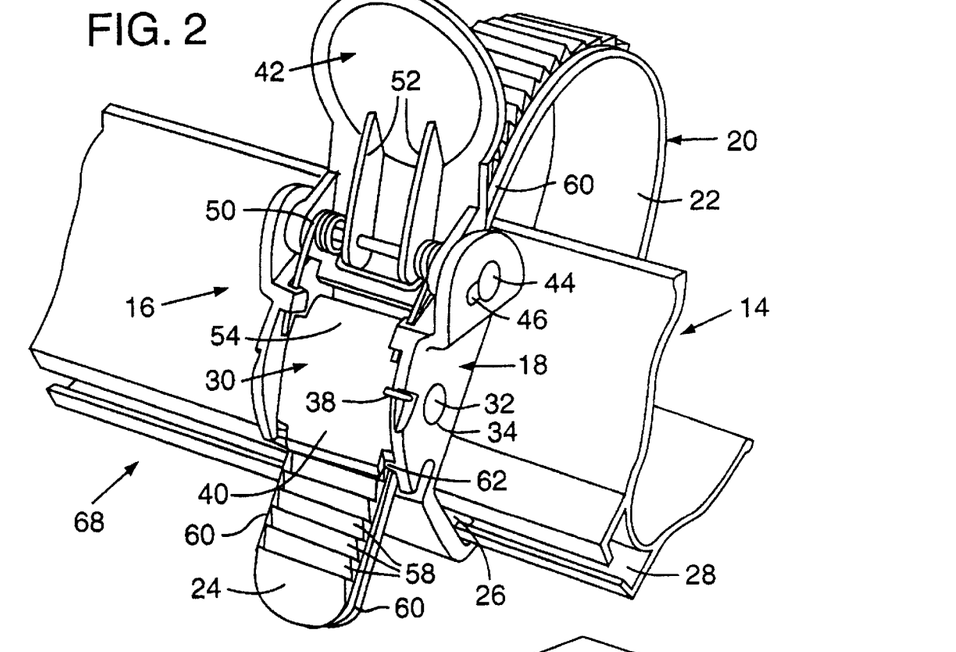
FIG. 2 is an isometric view showing a securing apparatus and portion of a support mount according to the present invention. The drive actuator is shown pivoted upward to advance the strap into the housing.
Figure 3:
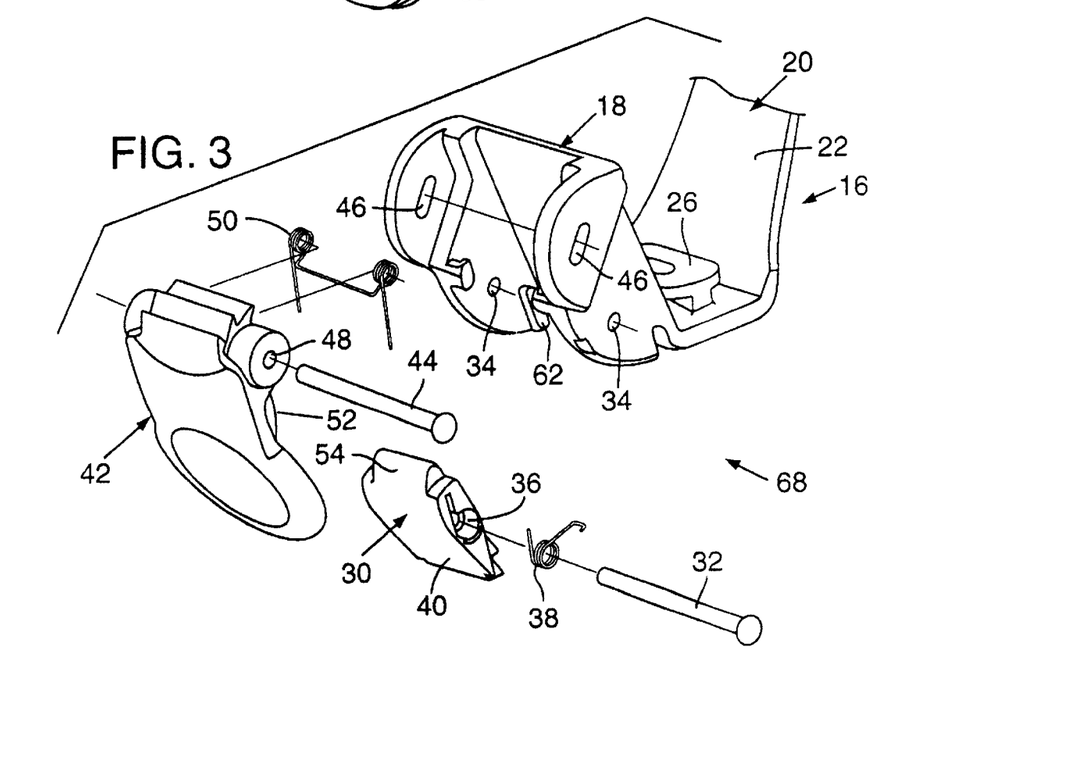
FIG. 3 is an exploded isometric view of the securing apparatus of FIG. 2, with a portion of the strap cut away.

Turning attention to FIGS. 2 and 3, securing apparatus 16 is shown in greater detail. The securing apparatus includes a housing 18, and a strap 20 having a near end 22 and a far end 24. In the exemplary embodiment, near end 22 is integrally formed with housing 18 from a single material. Alternatively, strap 20 and housing 18 may be formed separately and connected by any suitable means such as rivets, bolts, etc. In any event far end 24 is adapted to extend around at least a portion of the recreational equipment and be received into housing 18.

Securing apparatus 16 is movably coupled to support member 14 to allow the strap to be selectively positioned on the support member. The securing apparatus includes a tongue 26 adapted to slidably engage a channel 28 in support member 14. Alternatively, securing apparatus 16 may be movably coupled to support member by other suitable mechanisms, or may be rigidly attached to the support member by a bolt, rivet, etc. As a further alternative, the securing member may not be attached to the support member, but instead may encircle the support member and recreational equipment to hold the equipment securely against the support member.

Securing apparatus 16 also includes a locking member 30 coupled to housing 18 and configured to engage the strap and retain it in the housing. Locking member 30 is configured to allow the strap to be inserted into the housing while preventing the strap from being removed from the housing. In the exemplary embodiment, the locking member is pivotally coupled to the housing by a rivet pin 32 which extends through holes 34 in the housing and hole 36 in the locking member. A spring 38 biases a back end 40 of the locking member toward the housing.

The securing apparatus further includes a drive actuator or lever 42 coupled to housing 18 and operable to grip the strap and advance it through the housing to tighten the strap around the recreational equipment. In the exemplary embodiment, drive actuator 42 is pivotally coupled to housing 18 by a rivet pin 44 that passes through holes 46 in the housing and holes 48 in the drive actuator. A spring 50 biases the drive actuator downward over locking member 30. A pair of ribs 52 are formed on the underside of the drive actuator and abut against a front end 54 of the locking member.

The operation of securing apparatus 16 is illustrated in FIGS. 4–7. Apparatus 16 is shown movably coupled to a support member 14, which is adapted to support a wheel 104 of a bicycle. Strap 20 extends around wheel 104 and is received into housing 18. A plurality of grip elements or teeth 58 extend laterally across the strap. The strap passes between drive actuator 42 and locking member 30 on one side and the bottom wall of housing 18 on the other side. Teeth 58 face toward the drive actuator and locking member so that the strap can slide along the bottom wall of the housing. As best seen in FIGS. 2 and 3, teeth 58 extend across the strap between smooth edge regions 60. The strap passes into the housing and under opposing guide rails 62 projecting from either side of the housing. The guide rails slide over edge regions 60 and hold the strap against the bottom wall of the housing.

Figures 4, 5:
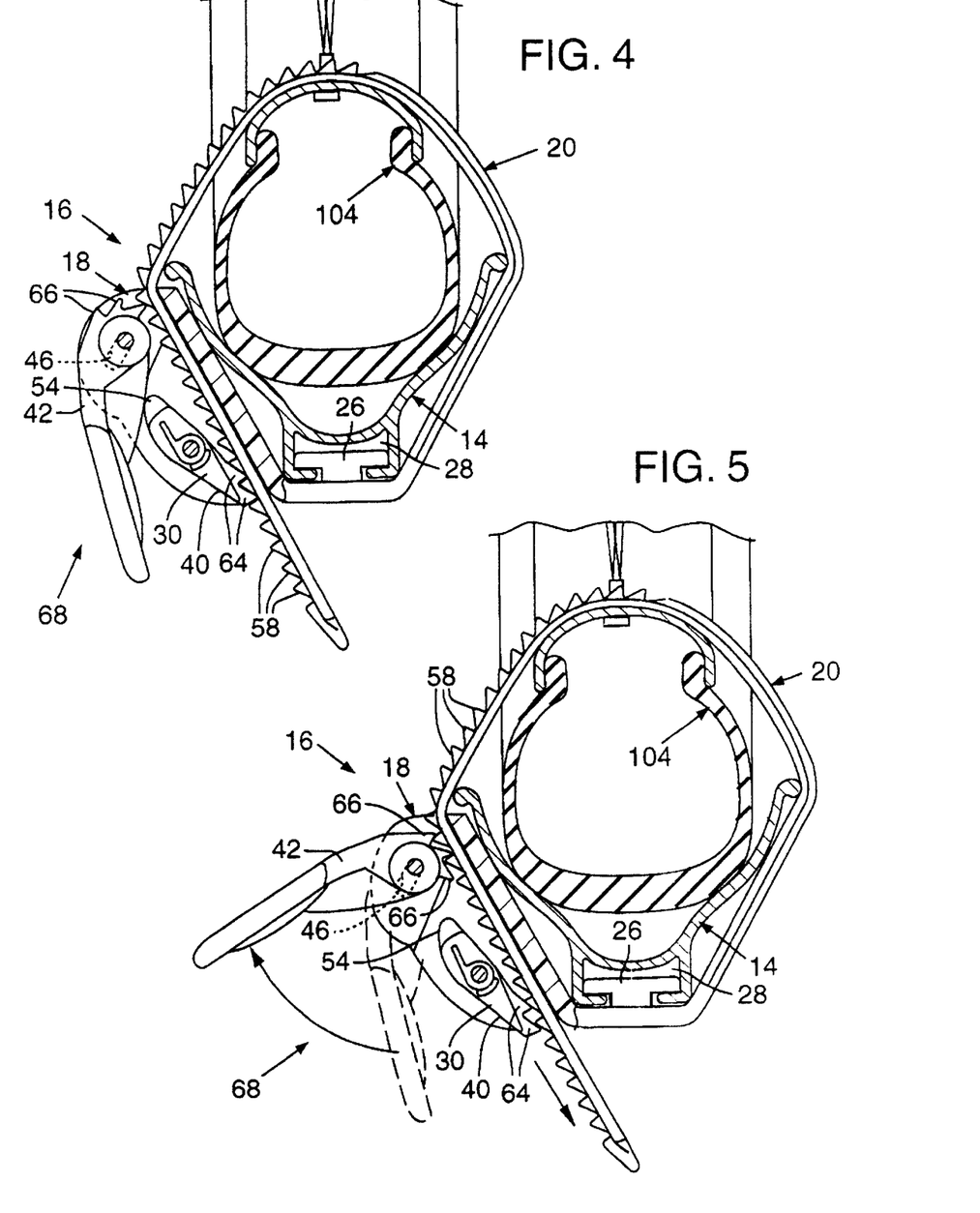
FIG. 4 is a front elevation and partial cross-sectional view showing a securing apparatus attached to a support member and arranged to secure a bicycle tire to the support member. The actuator arm is shown in a nominal, released position.
FIG. 5 is similar to FIG. 4 but shows the actuator arm pivoted upward to drive the strap through the housing.

In the exemplary embodiment, locking member 30 functions as a ratchet. Referring back to FIGS. 4–7, the underside of locking member 30 includes a pawl structure such as one or more teeth 64, configured to engage teeth 58 on the strap. Teeth 64 are disposed adjacent back end 40 and interlock with teeth 58 when the back end is pivoted toward the strap, as seen in FIG. 4. Teeth 58 on the strap and teeth 64 on the locking member are formed with an incline such that the locking member only grips the strap in do one direction. When the strap is pulled in a forward direction through the housing, locking member 30 pivots upward to allow the strap to pass, as shown in FIG. 5. However, when the strap is pulled backward out of the housing, teeth 64 interlock with teeth 58 and block movement of the strap to retain it in the housing, as shown in FIG. 4.

Figures 6, 7:
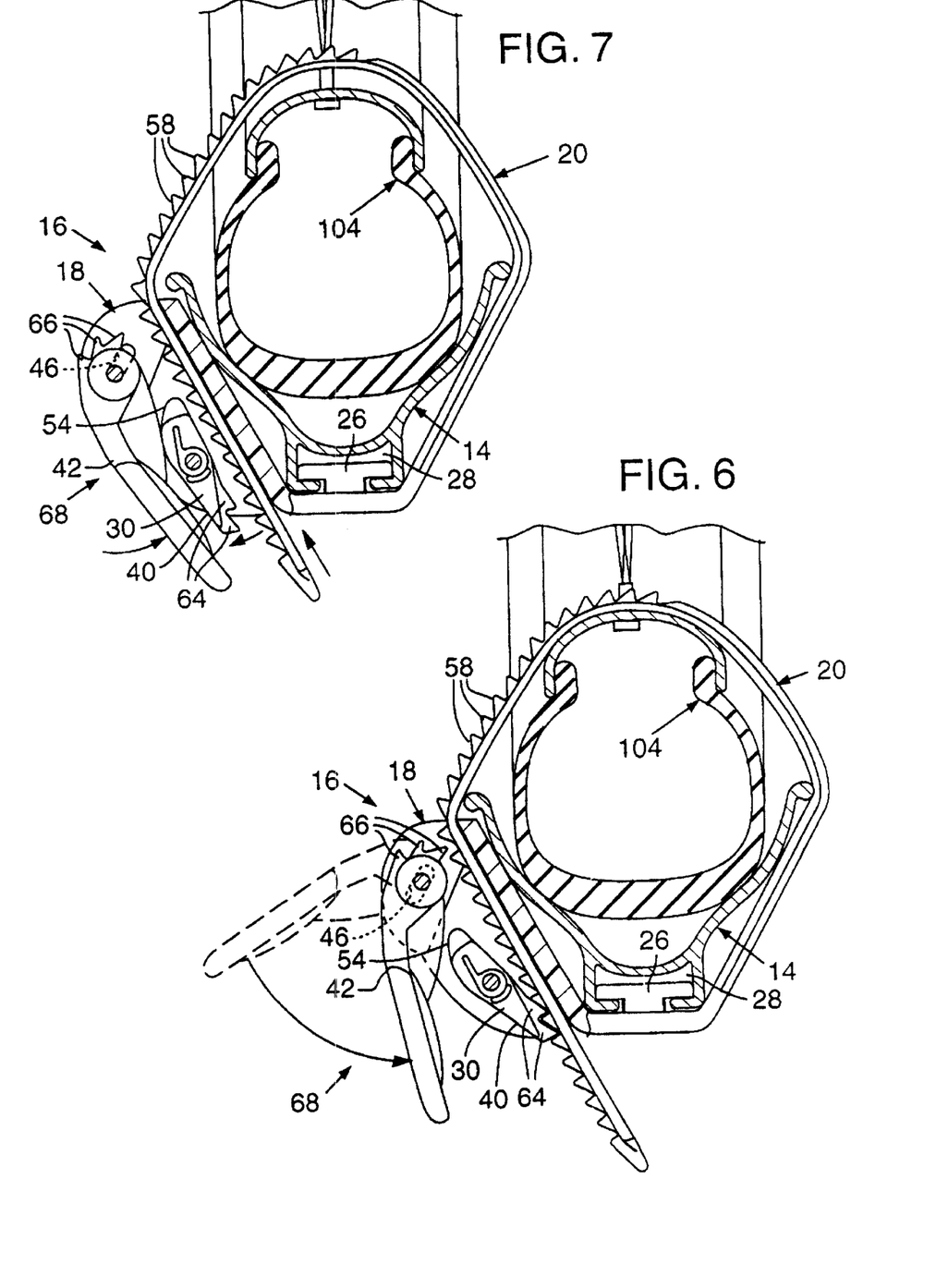
FIG. 6 is similar to FIG. 5 but shows the actuator arm pivoting downward to return to its nominal position.
FIG. 7 is similar to FIG. 4 but shows the actuator arm pivoting downward past its nominal position to disengage the locking member from the strap.

Drive actuator 42 also includes one or more teeth 66 configured to engage teeth 58 on the strap. When the drive actuator is pivoted upward, teeth 66 interlock with, and engage teeth 58 to drive the strap through the housing, as shown in FIG. 5. As the drive actuator advances the strap through the housing, locking member 30 grips the strap and prevents it from pulling back out of the housing. As shown in FIG. 6, the drive actuator is then pivoted downward, under the bias of spring 50, into position to grip the next successive portion of the strap. Hole 46 in housing 18 is oblong, allowing pin 44 and drive actuator 42 to slide away from the strap. This enables teeth 66 to slide over teeth 58 on the downward stroke of drive actuator 42.

In addition to driving strap 20 into housing 18, exemplary drive actuator 42 also is operable to disengage locking member 30 from the strap. As mentioned above, ribs 52 abut against the front end of the locking member when the drive actuator is released. Although the bias imparted to the drive actuator by spring 50 causes the ribs to apply a downward force on the front end of the locking member, the upward bias on the front end of the locking member due to spring 38 is sufficient to support the downward force applied by the ribs. However, a user may overcome the bias of spring 38 by pressing the drive actuator downward against the front end of the locking member. As shown in FIG. 7, this causes pin 44 and drive actuator 42 to slide backward in oblong hole 46 to a position more directly over the front end of the locking member. Continued downward movement by the drive actuator causes the back end of the locking member to pivot away from the strap, thereby disengaging teeth 64 from teeth 58 and allowing the strap to be removed from the housing.

Together, housing 18, locking member 30 and drive actuator 42 form a ratchet drive mechanism 68 adapted to receive the far end of strap 20 and tighten it around the recreational equipment. To operate the ratchet drive mechanism, the user positions the strap around the recreational equipment and inserts the far end of the strap into the housing until the strap is gripped by locking member 30. The user then repeatedly pivots drive actuator 42 up and down to grip successive portions of the strap and draw it tight. The drive actuator functions as a lever to magnify the force applied by the user. To release the strap, the user pivots the drive actuator downward into the locking member to disengage the locking member from the strap.

It will be appreciated that the drive mechanism may be operably formed in alternative configurations to those shown in the exemplary embodiments. As one example, drive actuator 42 may be in the form of a knob attached to a circular gear that engages the strap as the knob is rotated. Alternatively, mechanism 56 may omit drive actuator 42 and the strap may be advanced through the housing by other means (e.g., pushing or pulling the strap through the housing, etc.). As another alternative, mechanism 56 may omit the locking member and the housing may grip the strap by other means (e.g., frictionally, etc.).

The various components of securing apparatus 16 may be formed of any single material or combination of materials including metal, plastic, etc. In the embodiment where housing 18 and strap 20 are integrally formed of a single material, one suitable material is a rigid plastic such as injection-molded nylon. Locking member 30 and drive actuator 42 may also be formed of injection-molded nylon. Typically, though not necessarily, springs 38 and 50, and pins 32 and 44 are formed of metal.

Figures 8, 9:
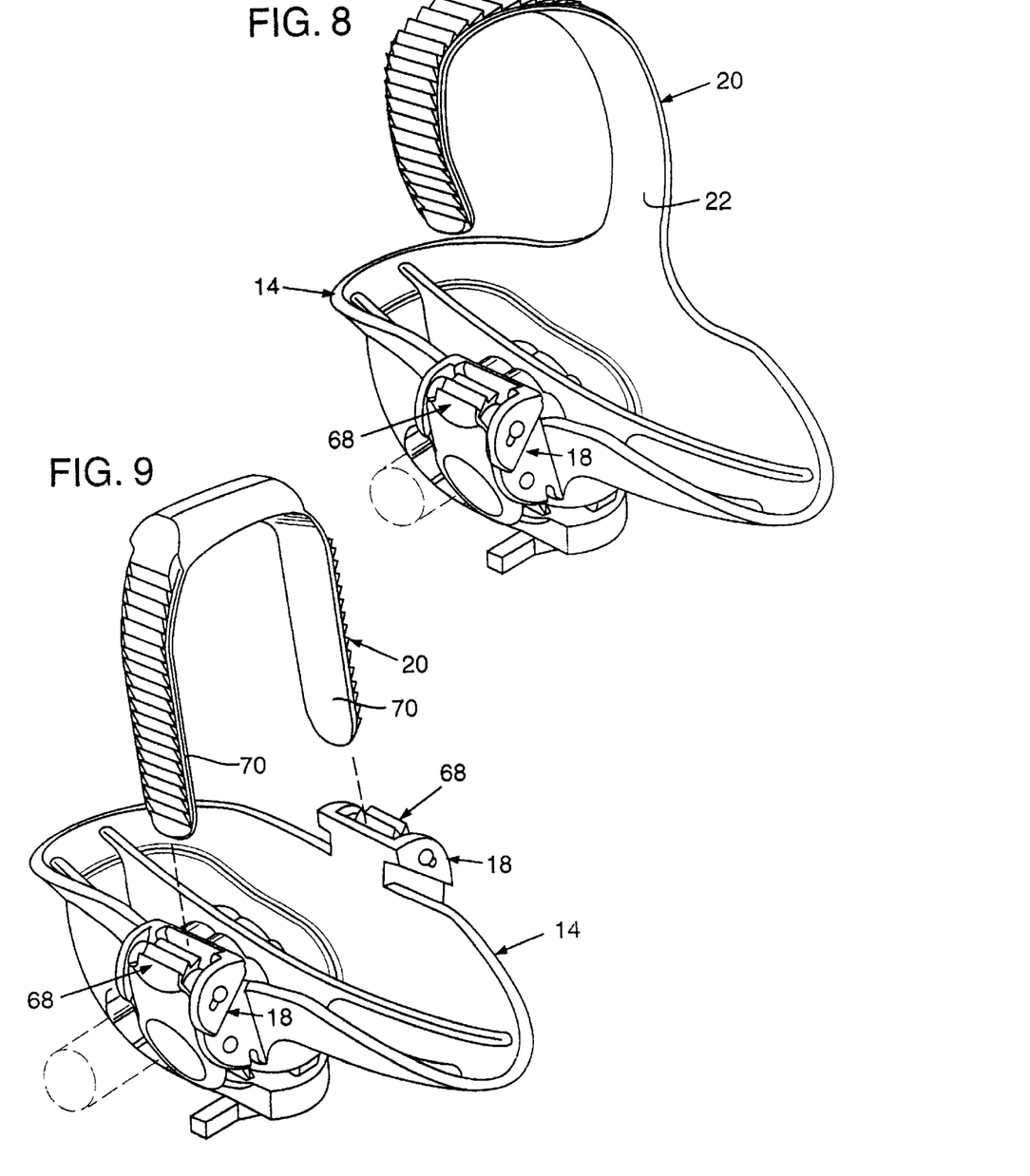
FIG. 8 is an isometric view of another exemplary embodiment of the invention in which the securing apparatus is integrally formed with the supporting member.
FIG. 9 is an isometric view of another exemplary embodiment of the invention in which two ratchet drive mechanisms are formed on either side of a support member to receive opposite ends of a reversible strap.

FIG. 8 illustrates another embodiment where at least a portion of securing apparatus 16 is integrally formed with support member 14 from a single material. Near end 22 of strap 20 is formed with one side of the support member, while housing 18 is formed with the opposite side of the support member. This embodiment ensures that the securing apparatus does not become dislodged or lost. Alternatively, either or both of strap 20 and housing 18 may be formed separately and then either permanently or removably attached to the support member by bolts, rivets, adhesive, snap-on connectors, etc.

FIG. 9 illustrates another embodiment where securing apparatus 16 includes plural ratchet drive mechanisms 68. The housings of the ratchet drive mechanisms are integrally formed with opposite sides of support member 14. Alternatively, one or both housings may be formed separately and attached to the support member by bolts, rivets, adhesive, etc. Strap 20 is formed separately with symmetrical ends 70. The ends include teeth 58 formed with opposing inclines adapted to be received by the opposing ratchet drive mechanisms. The embodiment shown in FIG. 9 allows the user to tighten the strap from either side of the support member. Thus, the support member and securing apparatus can be mounted on either side of a vehicle for similar ease of use.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. An apparatus for securing a bicycle on a vehicle rack comprising
    a strap having teeth on a top side,
    a housing configured to receive the strap, the strap being moveable through the housing in a tightening direction and in an opposite loosening direction,
    a pawl pivotally mounted on the housing, the pawl having a front end and a back end, the back end of the pawl being biased into engagement with the teeth on the top side of the strap, the teeth being configured so that when the pawl engages the strap, the strap is permitted to slide relative to the housing in the tightening direction but not in the loosening direction,
    a handle actuator pivotally connected directly to the housing, the handle actuator having teeth for engaging the teeth on the strap so that the handle actuator can be manipulated to drive the strap through the housing in the tightening direction while the pawl prevents loosening of the strap.

2. The apparatus of claim 1, wherein the pawl and actuator are fully operable to engage and disengage the teeth on the strap with only two pivotal axes.

3. The apparatus of claim 1, wherein the strap and the housing are formed of the same piece of material.

4. The apparatus of claim 1, wherein the actuator is pivotally mounted on a pin that defines a pivotal axis for the actuator, the housing having a pair of slots holding the pin on opposite sides of the housing so that the pivotal axis of the actuator can move linearly within the slots of the housing.

5. The apparatus of claim 4, wherein the pin moves in the slots when the actuator is pressed against the front end of the pawl.

6. The apparatus of claim 1, wherein the actuator can be depressed into contact with the front end of the pawl causing the pawl to rotate out of engagement with the teeth of the strap, thereby permitting sliding of the strap, relative to the housing, in the loosening direction.

7. The apparatus of claim 1, wherein the actuator is biased into contact with the front end of the pawl with a force that is insufficient to disengage the pawl from the teeth on the strap without manually depressing the actuator toward the pawl, so that the strap can be easily freed to move in the loosening direction by a single step of pressing the actuator against the front end of the pawl.

8. The apparatus of claim 1, wherein the housing has lateral sides defining a housing compartment, substantially all engagement of the strap by the pawl and the actuator occurring inside the housing compartment.

9. The apparatus of claim 1, wherein the housing is mounted on a wheel tray for supporting a bicycle.

10. The apparatus of claim 1, wherein the apparatus is configured to secure the wheel of the bicycle.

11. The apparatus of claim 1, wherein the housing has a ledge projection configured for attachment under a wheel tray for supporting a bicycle.

12. An apparatus for securing a bicycle on a vehicle rack comprising
    a strap having teeth on a top side,
    a housing configured to receive the strap, the strap being moveable through the housing in a tightening direction and in an opposite loosening direction,
    a pawl pivotally mounted on the housing, the pawl having a front end and a back end, the back end of the pawl being biased into engagement with the teeth on the top side of the strap, the teeth being configured so that when the pawl engages the strap, the strap is permitted to slide relative to the housing in the tightening direction but not in the loosening direction,
    an actuator pivotally mounted on a pin that defines a pivotal axis for the actuator, wherein the housing has a pair of slots holding the pin on opposite sides of the housing so that pivotal axis of the actuator can move linearly within the slots of the housing, the actuator having teeth for engaging the teeth on the strap so that the actuator can be manipulated to drive the strap through the housing in the tightening direction while the pawl prevents loosening of the strap.

13. The apparatus of claim 12, wherein the actuator has a handle for controlling sliding movement of the strap within the housing.

14. The apparatus of claim 12, wherein the pawl and actuator are fully operable to engage and disengage the teeth on the strap with only two pivotal axes.

15. The apparatus of claim 12, wherein the strap and the housing are formed of the same piece of material.

16. The apparatus of claim 12, wherein the pin moves in the slots when the actuator is pressed against the front end of the pawl.

17. The apparatus of claim 12, wherein the actuator can be depressed into contact with the front end of the pawl causing the pawl to rotate out of engagement with the teeth of the strap, thereby permitting sliding of the strap, relative to the housing, the loosening direction.

18. The apparatus of claim 12, wherein the actuator is biased into contacting the front end of the pawl with a force that is insufficient to disengage the pawl from the teeth from the strap without manually depressing the actuator toward the pawl, so that the strap can be easily freed to move in a loosening direction by a single step of pressing the actuator against the front end of the pawl.

19. The apparatus of claim 12, wherein the housing has lateral sides defining a housing partner, substantially all engagement of the strap by the pawl and the actuator occurring inside the housing compartment.

20. The apparatus of claim 12, wherein the apparatus is adapted to secure the wheel of a bicycle.

21. The apparatus of claim 12, wherein the housing has a ledge projection configured for attachment under a wheel tray for supporting a bicycle.

22. An apparatus for securing a bicycle on a vehicle rack comprising
- a strap having teeth on a top side,
- a housing configured to receive the strap, the strap being moveable through the housing in a tightening direction and in an opposite loosening direction,
- a pawl pivotally mounted on the housing, the pawl having a front end and a back end, the back end of the pawl being biased into engagement with the teeth on the top side of the strap, the teeth being configured so that when the pawl engages the strap, the strap is permitted to slide relative to the housing in the tightening direction but not in the loosening direction,
- an actuator pivotally connected to the housing, the actuator having teeth for engaging the teeth on the strap so that the actuator can be manipulated to drive the strap through the housing in the tightening direction while the pawl prevents loosening of the strap, the actuator being biased into contact with the front end of the pawl with a force insufficient to disengage the pawl from the teeth on the strap without manually depressing the actuator toward the pawl, so that the strap can be easily freed to move in the loosening direction by a single step of pressing the actuator against the front end of the pawl.

23. The apparatus of claim 22, wherein the actuator has a handle portion for controlling sliding movement of the strap within the housing.

24. The apparatus of claim 22, wherein the pawl and actuator are fully operable to engage and disengage the teeth on the strap with only two pivotal axes.

25. The apparatus of claim 22, wherein the strap and the housing are formed from the same piece of material.

26. The apparatus of claim 22, wherein the actuator is pivotally mounted on a pin the defines a pivotal axis for the actuator, the housing having a pair of slots holding the pin on opposite sides of the housing so that the pivotal axes of the actuator can move linearly within the slots of the housing.

27. The apparatus of claim 26, wherein the pin moves in the slots when the actuator is pressed against the front end of the pawl.

28. The apparatus of claim 22, wherein the housing has lateral sides defining the housing compartment, substantially all engagement of the strap by the pawl and the actuator occurring inside the housing compartment.

29. An apparatus for securing a bicycle on a vehicle rack comprising
- a strap having teeth on a top side,
- a housing configured to receive the strap, the strap being moveable through the housing in a tightening direction and in an opposite loosening direction,
- a pawl pivotally mounted on the housing, the pawl having a front end and a back end, the back end of the pawl being biased into engagement with the teeth on the top side of the strap, the teeth being configured so that when the pawl engages the strap, the strap is permitted to slide relative to the housing in the tightening direction but not in the loosening direction,
- an actuator pivotally connected to the housing, the actuator having teeth for engaging the teeth on the strap so that the actuator can be manipulated to drive the strap through the housing in the tightening direction while the pawl prevents loosening of the strap, wherein the pawl and it actuator are fully operable to engage and disengage the teeth on the strap with only two pivotal axes, and
- wherein the actuator is pivotally mounted on a pin that defines a pivotal axis for the actuator, the housing having a pair of slots holding the pin on opposite sides of the housing so that the pivotal axis of the actuator can move linearly within the slots of the housing.

30. The apparatus of claim 29, wherein the pin moves in the slots when the actuator is pressed against the front end of the pawl.

31. An apparatus for securing a bicycle on a vehicle rack comprising
- a strap having teeth on a top side,
- a housing configured to receive the strap, the strap being moveable through the housing in a tightening direction and in an opposite loosening direction,
- a pawl pivotally mounted on the housing, the pawl having a front end and a back end, the back end of the pawl being biased into engagement with the teeth on the top side of the strap, the teeth being configured so that when the pawl engages the strap, the strap is permitted to slide relative to the housing in the tightening direction but not in the loosening direction,
- an actuator pivotally connected to the housing, the actuator having teeth for engaging the teeth on the strap so that the actuator can be manipulated to drive the strap through the housing in the tightening direction while the pawl prevents loosening of the strap, wherein the pawl and actuator are fully operable to engage and disengage the teeth on the strap with only two pivotal axes, and
- wherein the actuator is biased into contact with the front end of the pawl with a force that is insufficient to disengage the pawl from the teeth of the strap without manually depressing the actuator toward the pawl, so that the strap can be easily freed to move in the loosening by a single step of pressing the actuator against the front end of the pawl.

32. An apparatus for securing a bicycle on a vehicle rack comprising
- a strap having teeth on a top side,
- a housing configured to receive the strap, the strap being moveable through the housing in a tightening direction and in an opposite loosening direction,
- a pawl pivotally mounted on the housing, the pawl having a front end and a back end, the back end of the pawl being biased into engagement with the teeth on the top side of the strap, the teeth being configured so that when the pawl engages the strap, the strap is permitted to slide relative to the housing in the tightening direction but not in the loosening direction,
- an actuator pivotally connected to the housing, the actuator having teeth for engaging the teeth on the strap so that the actuator can be manipulated to drive the strap through the housing in the tightening direction while the pawl prevents loosening of the strap, wherein the pawl and actuator are fully operable to engage and disengage the teeth on the strap with only two pivotal axes, and
- wherein the housing has lateral sides defining a housing compartment, substantially all engagement of the strap by the pawl and the actuator occurring inside the housing compartment.

33. An apparatus for securing a bicycle on a vehicle rack comprising a strap having teeth on a top side, a housing configured to receive the strap, the strap being moveable through the housing in a tightening direction and in an opposite loosening direction, a pawl pivotally mounted on the housing, the pawl having a front end and a back end, the back end of the pawl being biased into engagement with the teeth on the top side of the strap, the teeth being configured so that when the pawl engages the strap, the strap is permitted to slide relative to the housing in the tightening direction but not in the loosening direction, an actuator pivotally connected to the housing, the actuator having teeth for engaging the teeth on the strap so that the actuator can be manipulated to drive the strap through the housing in the tightening direction while the pawl prevents loosening of the strap, wherein the housing holds the actuator in close proximity to the teeth on the strap when the actuator is not being used to advance the strap in the tightening direction, and wherein the actuator is biased into contact with the front end of the pawl with a force that is insufficient to disengage the pawl from the teeth from the strap without manually depressing the actuator toward the pawl, so that the strap can be easily freed to move in the loosening direction by a single step of pressing the actuator against the front end of the pawl.

34. An apparatus for securing a bicycle on a vehicle rack comprising a strap having teeth on a top side, a housing configured to receive the strap, the strap being moveable through the housing in a tightening direction and in an opposite loosening direction, a pawl pivotally mounted on the housing, the pawl having a front end and a back end, the back end of the pawl being biased into engagement with the teeth on the top side of the strap, the teeth being configured so that when the pawl engages the strap, the strap is permitted to slide relative to the housing in the tightening direction but not in the loosening direction, an actuator pivotally connected to the housing, the actuator having teeth for engaging the teeth on the strap so that the actuator can be manipulated to drive the strap through the housing in the tightening direction while the pawl prevents loosening of the strap, wherein the housing holds the actuator in close proximity to the teeth on the strap when the actuator is not being used to advance the strap in the tightening direction, and wherein the housing has lateral sides defining a housing compartment, substantially all engagement of the strap by the pawl and the actuator occurring inside the housing compartment.

35. An apparatus for securing a bicycle on a vehicle rack comprising a strap having teeth on a top side, a housing configured to receive the strap, the strap being moveable through the housing in a tightening direction and in an opposite loosening direction, a pawl pivotally mounted on the housing, the pawl having a front end and a back end, the back end of the pawl being biased into engagement with the teeth on the top side of the strap, the teeth being configured so that when the pawl engages the strap, the strap is permitted to slide relative to the housing in the tightening direction but not in the loosening direction, an actuator pivotally connected to the housing, the actuator having teeth for engaging the teeth on the strap so that the actuator can be manipulated to drive the strap through the housing in the tightening direction while the pawl prevents loosening of the strap, wherein the housing has lateral sides defining a housing compartment, substantially all engagement of the strap by the pawl and the actuator occurring inside the housing compartment.

36. An apparatus for securing a bicycle on a vehicle rack comprising a strap having teeth on a top side, a housing configured to receive the strap, the strap being moveable through the housing in a tightening direction and in an opposite loosening direction, the housing having a tongue structure configured for engaging a channel under a wheel tray for supporting a bicycle, a pawl pivotally mounted on the housing, the pawl having a front end and a back end, the back end of the pawl being biased into engagement with the teeth on the top side of the strap, the teeth being configured so that when the pawl engages the strap, the strap is permitted to slide relative to the housing in the tightening direction but not in the loosening direction, an actuator pivotally connected to the housing, the actuator having teeth for engaging the teeth on the strap so that the actuator can be manipulated to drive the strap through the housing in the tightening direction while the pawl prevents loosening of the strap.

37. The apparatus of claim 36, wherein the tongue structure is located between the housing and strap.

38. The apparatus of claim 36, wherein the housing, tongue structure and strap are all formed from the same piece of material.

39. A rack assembly for carrying a bicycle on a vehicle, comprising:

a mount attachable to the vehicle;

a wheel support member coupled to the mount and configured to support a bicycle wheel adjacent the vehicle; and a wheel securing apparatus associated with the wheel support member and configured to secure the bicycle wheel to the wheel support member, wherein the wheel securing apparatus includes two ratchet drive mechanisms disposed to receive and grip opposite ends of the strap.

40. The rack of claim 39, wherein the strap includes a plurality of grip elements spaced along at least a portion of the strap, and wherein the drive actuator is operable to engage successive grip elements and draw the strap tight around the bicycle wheel.

41. The rack of claim 40, wherein the ratchet drive mechanism includes a locking member adapted to engage one or more of the grip elements to prevent loosening of the strap.

42. The rack of claim 40, wherein the drive actuator is operable to disengage the locking member from the grip elements to allow the strap to be loosened from around the bicycle.

43. The rack of claim 39, wherein at least a portion of the wheel securing apparatus is integrally molded with the wheel support member.

44. The rack of claim 39, wherein the wheel securing apparatus is movably coupled to the wheel support member.

* * * * *